United States Patent
Gupta et al.

(10) Patent No.: US 7,234,030 B1
(45) Date of Patent: Jun. 19, 2007

(54) TABLE-BASED SCHEDULER FOR FIFOS AND THE LIKE

(75) Inventors: Navdhish Gupta, Chicago, IL (US); Gary D. Allen, Chicago, IL (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 361 days.

(21) Appl. No.: 10/809,180

(22) Filed: Mar. 25, 2004

(51) Int. Cl.
*G06F 12/00* (2006.01)

(52) U.S. Cl. ............... 711/154; 711/220; 711/221

(58) Field of Classification Search ............ 711/154, 711/220, 221
See application file for complete search history.

(56) References Cited

U.S. PATENT DOCUMENTS 5,982,776 A * 11/1999 Manning et al. ............ 370/414
6,732,206 B1 * 5/2004 Jensen et al. ............... 710/105
2005/0122982 A1 * 6/2005 Li et al. .................. 370/395.41

* cited by examiner

*Primary Examiner*—Woo H. Choi

(57) ABSTRACT

A scheduler for a set of data packet storage devices (e.g., FIFOs) implements a scheduling algorithm embodied in a look-up table (LUT) that identifies the next FIFO to select for service based on the current status of the FIFOs. In one embodiment, in addition to a memory device used to store the LUT, the scheduler has (1) a latch adapted to store and forward the LUT output and (2) an extractor that implements a finite state machine that determines (1) when to enable the latch and (2) when to forward the identification of the next FIFO to select for service to the set of FIFOs. Using a LUT enables relatively complicated scheduling algorithms to be implemented for relatively large numbers of FIFOs without significantly increasing the execution time of the scheduler.

14 Claims, 3 Drawing Sheets

TABLE-BASED SCHEDULER FOR FIFOS AND THE LIKE

TECHNICAL FIELD

The present invention relates to circuitry for computers and other data processing equipment and, in particular, to schedulers for processing packets of data temporarily stored in a set of data packet storage devices such as first-in, first-out (FIFO) buffers.

BACKGROUND

In recent years, many communications systems have moved away from time-division multiplexed (TDM) systems to higher-speed, and more-flexible, packet-based systems. These packet-based systems often include elements that switch and translate packets of data between numerous different communications protocols. This processing often relies on FIFO buffers to store and forward data packets. Often a different FIFO is used to buffer data from each independent communication channel in order to prevent blockage by packets from other channels. Since many high-speed packet protocols support multiple independent data channels, the task of efficiently inserting and extracting packets into and out of these buffers can be challenging. This is because, with several FIFOs in the system, determining which FIFO to service next, and how to service it, may depend on several variables, including information on which FIFO is currently being serviced, as well as a scheduling algorithm that might depend on each of the other FIFO's status information (e.g., data available status) and the status of the service process (e.g., extracting packets).

The function of determining which FIFO to service next is typically implemented using a finite state machine (FSM)-based device referred to as a FIFO scheduler. In programmable, hardware-based solutions, such as field-programmable gate arrays (FPGAs) and the like, FIFO schedulers are implemented using FSMs that use combinatorial feedback logic. Typically, the more FIFOs that need to be scheduled and/or the more complicated the FIFO scheduling algorithm, the more complex the combinatorial feedback logic needed to implement the FSM of the FIFO scheduler. In order to keep the size and the execution time delay associated with FSM implementation and operation, respectively, at acceptable levels, either the number of FIFOs or the complexity of the FIFO scheduling algorithm is limited or both. This imposes undesirable constraints on such hardware-based solutions, often resulting in less-than-optimal implementations.

SUMMARY

Problems in the prior art are addressed in accordance with the principles of the present invention by a scheduler for FIFOs (or other similar data packet storage devices) that relies on a look-up table (LUT) to determine which FIFO to service next, based on the current status of the FIFOs.

In one embodiment, the present invention is a scheduler for a plurality of packet storage devices, the scheduler comprising a memory device, a latch, and an extractor. The memory device is adapted to store a look-up table (LUT) that maps an input address to a LUT output, wherein the input address corresponds to current status of one or more of the packet storage devices, and the LUT output identifies a next packet storage device to select for service and whether the next packet storage device has data available for service. The latch is adapted to store and forward the LUT output, and the extractor is adapted to receive (1) the forwarded LUT output from the latch and (2) service status information from the packet storage devices and to generate (1) a latch enable (LE) control signal that enables the latch to forward the LUT output and (2) a read enable (RE) control signal that identifies which one or more packet storage devices are to be serviced.

BRIEF DESCRIPTION OF THE DRAWINGS

Other aspect, features, and advantages of the present invention will become more fully apparent from the following detailed description, the appended claims, and the accompanying drawings in which like reference numerals identify similar or identical elements.

DETAILED DESCRIPTION

Figure 1:
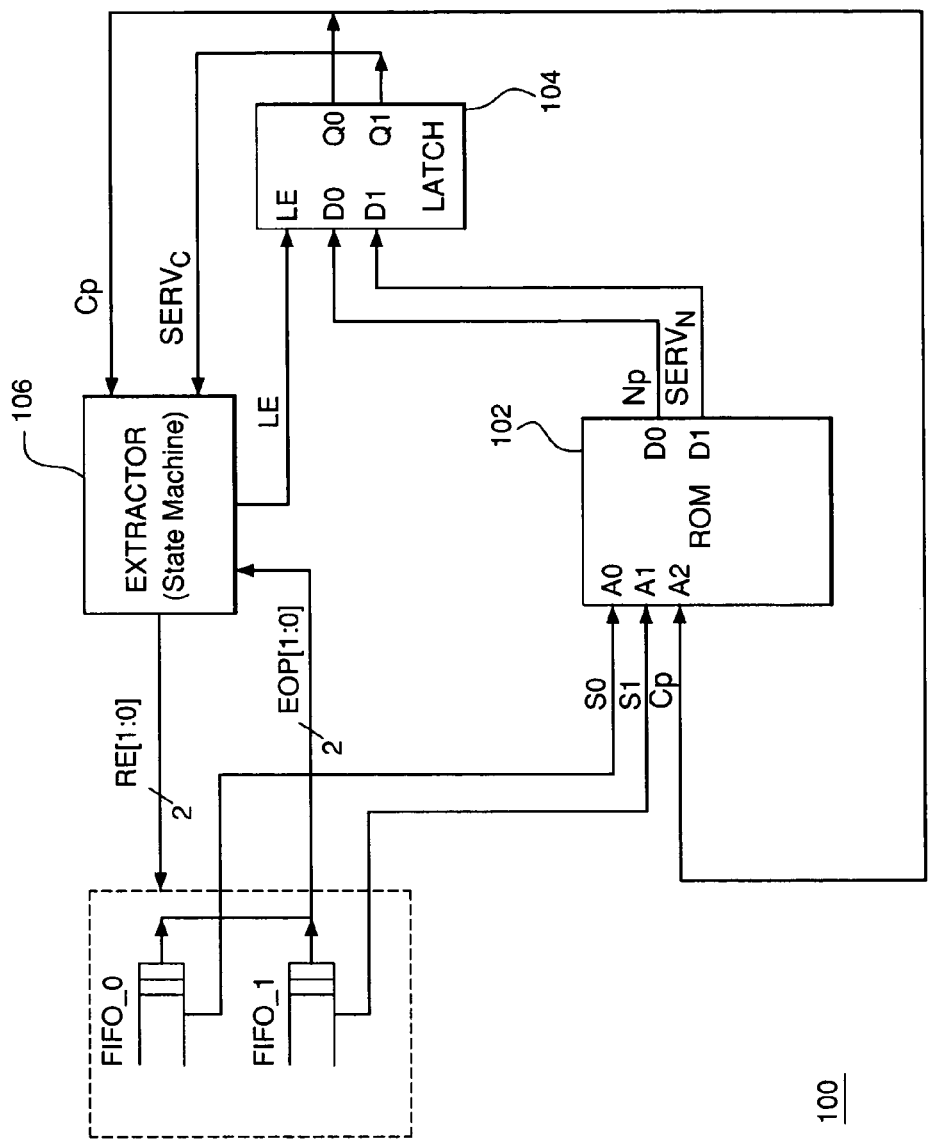
FIG. 1 shows a block diagram of a data packet processing system, according to one embodiment of the present invention in which the FIFO scheduler controls the operations of two FIFOs.

FIG. 1 shows a block diagram of a data packet processing system 100, according to one embodiment of the present invention. Processing system 100 has (a) a bank of two FIFO buffers (FIFO_0 and FIFO_1) for storing packets of data, for example, for two different communication channels, and (b) FIFO scheduling circuitry (referred to as "the FIFO scheduler") for determining how and when data packets are to be removed from those FIFOs. In this embodiment, the FIFO scheduler includes memory 102 (e.g., a read-only memory (ROM) device), synchronous latch 104, and extractor 106. Unless otherwise indicated, all data lines in FIG. 1 correspond to one-bit signals.

Although not shown in FIG. 1, extractor 106, synchronous latch 104, and the two FIFOs are all synchronous to one clock signal. As used in this specification, a synchronous latch is any suitable device for storing and forwarding data based on that clock signal. In addition to the clock signal, latch 104 has two data inputs D0 and D1, a latch enable input LE, and two data outputs Q0 and Q1. When LE is enabled (e.g., high), the values of outputs Q0 and Q1 get updated to the values of inputs D0 and D1 at every cycle of the clock signal (e.g., at every clock rising edge). When LE is disabled, the values of outputs Q0 and Q1 are fixed and will not update with the clock signal, even though the values of inputs D0 and D1 will continue to update. Latch 104 can be implemented with a pair of flip-flops (i.e., one for each Di/Qi input/output pair), where each flip-flop also receives the clock signal and LE.

As shown in FIG. 1, each FIFO outputs a status bit (S0 from FIFO_0 and S1 from FIFO_1) that indicates whether or not the FIFO currently has a packet of data available for further processing (e.g., Si=1 implies that FIFO_i has at least one available data packet, while Si=0 implies that FIFO_i does not have at least one available data packet). (The exact process by which data is transmitted to and stored within the various FIFOs it not critical for purposes of the present invention). In some implementations, a FIFO has a data packet available whenever it currently stores at least one complete data packet. In other implementations, a data packet is available only when the FIFO currently stores more than a specified threshold number of data packets, where that threshold is greater than zero.

These two FIFO status bits S0 and S1 are applied as inputs to memory 102. Also applied as an input to memory 102 is bit Cp, which indicates which FIFO is currently selected for service (e.g., selected to have a data packet (if available) removed therefrom) (e.g., Cp=0 implies that FIFO_0 is currently selected for service, while Cp=1 implies that FIFO_1 is currently selected for service).

The three one-bit inputs (S0, S1, and Cp) are used to form a three-bit address for retrieving data from a look-up table stored within memory 102. In particular, the LUT maps each three-bit input address to a two-bit LUT output consisting of bit Np and bit $SERV_N$. Bit Np identifies the next FIFO to be selected for service (e.g., Np=0 implies that FIFO_0 is to be selected for service next, while Np=1 implies that FIFO_1 is to be selected for service next), while bit $SERV_N$ indicates that the next FIFO to be selected for service has a data packet available (e.g., $SERV_N$=1 implies that the next FIFO to be selected for service has a data packet available, while $SERV_N$=0 implies that the next FIFO to be selected for service does not have a data packet available).

Latch 104 receives and stores $N_p$ and $SERV_N$ from memory 102. In addition, latch 104 receives a one-bit latch enable (LE) control signal from extractor 106. When LE=1, latch 104 forwards Np and $SERV_N$ as Cp and $SERV_C$, respectively. As described above, Cp identifies the FIFO currently selected for service. Analogous to $SERV_N$ described above, $SERV_C$ indicates whether the FIFO currently selected for service has a data packet available (e.g., $SERV_C$=1 implies that the FIFO currently selected for service has a data packet available, while $SERV_C$=0 implies that the FIFO currently selected for service does not have a data packet available).

In addition to Cp being applied to memory 102, Cp and $SERV_C$ are also applied to extractor 106. Also applied to extractor 106 is information from the FIFOs indicating the status of the service of the FIFOs. For example, in one implementation, the FIFOs transmit a two-bit FIFO service status signal EOP[1:0] to extractor 106, where each bit can be used to indicate the timing of the completion of the extraction of a data packet from the corresponding FIFO. For example, EOP[0]=1 indicates the timing of the completion of the extraction of a data packet from FIFO_0, while EOP[1]=1 indicates the timing of the completion of the extraction of a data packet from FIFO_1. Although EOP is shown as a multi-bit value, in an alternative implementation, EOP could be a single-bit value that is set to 1 to indicate the timing of the completion of the extraction of a data packet from the currently selected FIFO (whichever FIFO that may be).

The exact time that an EOP bit is set to 1 will depend on the particular type of FIFO used in the processing system. For example, for some types of FIFOs, EOP[i] is set to 1 when the last byte of packet data is extracted from FIFO_i. For other types of FIFOs, EOP[i] is set to 1 at other times, e.g., when the penultimate byte is extracted from FIFO_i. Depending on the particular type of FIFO is used, the timing for the rest of the processing system is designed accordingly.

Based on these inputs (Cp, $SERV_C$, EOP[1:0]), extractor 106 generates the one-bit LE control signal and a two-bit read enable control signal RE[1:0]. As described above, LE enables latch 104 to forward its stored data Np and $SERV_N$ to update Cp and $SERV_C$, respectively. Each bit of RE indicates whether the corresponding FIFO is to be currently serviced (i.e., is to have a data packet removed therefrom). For example, RE[0]=1 implies that FIFO_0 should be serviced, while RE[0]=0 implies that FIFO_0 should not be serviced. Similarly, RE[1]=1 implies that FIFO_1 should be serviced, while RE[1]=0 implies that FIFO_1 should not be serviced. In a preferred implementation, no more than one bit of RE is set to 1 at any given time.

The exact details of when FIFO_0 and FIFO_1 get serviced depend on (1) the logic designed into extractor 106 and (2) the scheduling algorithm embodied in the LUT stored in memory 102.

Figure 2:
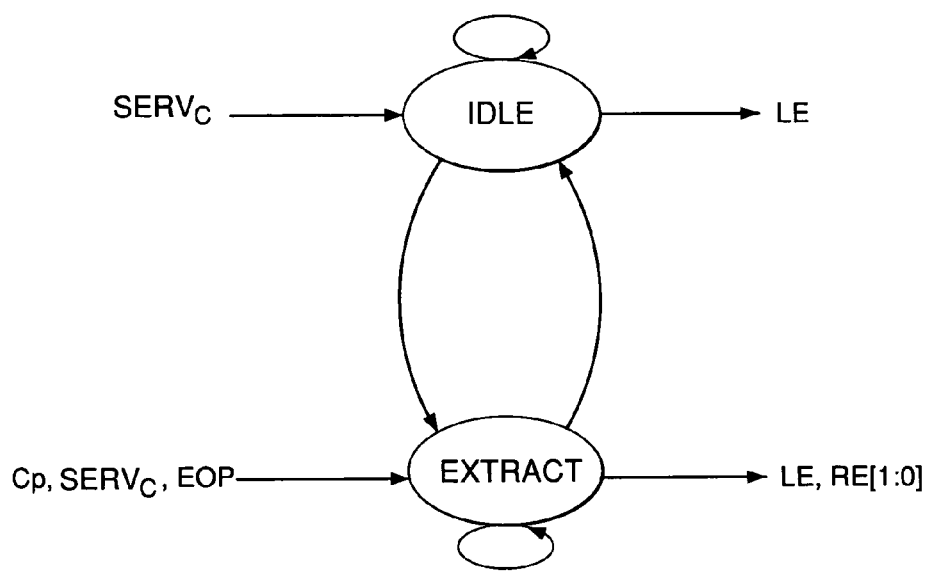
FIG. 2 shows a state diagram of the processing implemented by the extractor of FIG. 1 for an exemplary implementation of the extractor's finite state machine.

FIG. 2 shows a state diagram of the processing implemented by extractor 106 of FIG. 1 for an exemplary implementation of the extractor's FSM. According to this implementation, the extractor's FSM has two states: IDLE and EXTRACT.

The input to the IDLE state is $SERV_C$ (indicating whether the currently selected FIFO has data available). When the FSM is in the IDLE state and $SERV_C$=0 (indicating that the FIFO currently selected for service has no data available for service), extractor 106 sets the latch enable control signal LE to 1, and the FSM remains in the IDLE state. When the FSM is in the IDLE state and $SERV_C$=1 (indicating that the FIFO currently selected for service does have data available for service), the FSM transitions to the EXTRACT state.

The inputs to the EXTRACT state are Cp (indicating the FIFO currently selected for service), $SERV_C$ (indicating whether the currently selected FIFO has data available), and EOP (indicating whether extraction of a data packet from the FIFOs has just been completed). When the FSM is in the EXTRACT state and EOP=1 (indicating that the extraction of a data packet has just been completed), extractor 106 sets the latch enable control signal LE to 1 and updates the read enable control signal RE[1:0], and the FSM remains in the EXTRACT state. In particular, RE[1:0] is set such that the bit corresponding to the FIFO indicated by Cp is set to 1 and the bit corresponding to the other FIFO is set to 0. When the FSM is in the EXTRACT state and $SERV_C$=0 (indicating that the FIFO currently selected for service does not have data available for service), the FSM transitions to the IDLE state.

Because the FSM implemented by extractor 106 has only three different inputs (Cp, $SERV_C$, and EOP[1:0]) and two different states (IDLE and EXTRACT), the FSM can usually be efficiently implemented using combinatorial feedback logic. In alternative embodiments, the entire FSM could be implemented in software or in a combinatorial of software and hardware, in either case with or without a look-up table (different from the LUT in memory 102).

Table I shows an exemplary look-up table for memory 102 of FIG. 1. In particular, Table I indicates how each three-bit input address (formed from S0, S1, and Cp) is mapped to each two-bit LUT output (corresponding to Np and $SERV_N$).

TABLE I

EXEMPLARY LOOK-UP TABLE

| ROM Addresses | | | ROM Outputs | |
| --- | --- | --- | --- | --- |
| Cp | S1 | S0 | Np | $SERV_N$ |
| 0 | 0 | 0 | 0 | 0 |
| 0 | 0 | 1 | 0 | 1 |
| 0 | 1 | 0 | 1 | 1 |
| 0 | 1 | 1 | 1 | 1 |

TABLE I-continued

EXEMPLARY LOOK-UP TABLE

| ROM Addresses | | | ROM Outputs | |
|---|---|---|---|---|
| Cp | S1 | S0 | Np | $SERV_N$ |
| 1 | 0 | 0 | 1 | 0 |
| 1 | 0 | 1 | 0 | 1 |
| 1 | 1 | 0 | 1 | 1 |
| 1 | 1 | 1 | 0 | 1 |

Applying the FSM of FIG. 2 (initialized, e.g., into the IDLE state with Cp=0, $SERV_C$=0, EOP[1:0]=(00), RE[1:0]=(00), and LE=0) and the LUT of Table I to processing system 100 of FIG. 1 yields the following operational results for the system's FIFO scheduler. Assume that, at the beginning of processing, both FIFOs are empty (i.e., S0=0 and S1=0). In that case, with Cp (e.g., arbitrarily) initialized to 0, the first row of the LUT will apply, in which case, Np=0 and $SERV_N$=0 (i.e., FIFO_0 is to be the next FIFO selected for service, but data is not available in that FIFO). In that case, with the FSM in the IDLE state, extractor 106 will set LE=1, enabling latch 104 to update Cp and $SERV_C$ based on Np and $SERV_N$, respectively. In this case, at every execution cycle of extractor 106 (e.g., as driven by the clock signal (not shown)), the FSM will remain in the IDLE state and LE will remain set at 1.

Assume further that a data packet becomes available for processing in FIFO_0. In that case, S0 will get set to 1, while Cp and S1 remain at 0. In this case, according to the second row of the LUT, Np=0 and $SERV_N$=1. With LE enabled, latch 104 will set Cp=Np=0 and $SERV_C$=$SERV_N$=1. Setting $SERV_N$=1 will cause the FSM to transition to the EXTRACT state and extractor 106 to set RE[1:0] to (01) and LE to 0. Setting RE[1:0] to (01) enables FIFO_0 to read out a packet of data. When FIFO_0 finishes reading out that data packet, EOP[0] is set to 1 and S0 may or may not be reset to 0, depending on whether or not another packet entered FIFO_0. If another packet did not enter FIFO_0, then S0 would be reset to 0. Resetting S0 to 0 causes the input address for memory 102 to return to the first row of the LUT, which in turn causes $SERV_N$ to return to 0. Setting EOP[0] to 1 causes LE to be set to 1, which in turn causes latch 104 to update Cp and $SERV_C$.

The processing of the FIFO scheduler of FIG. 1 proceeds in analogous manner for all of the different conditions embodied in the LUT of Table I.

In a classical round-robin scheduling algorithm, the FIFO scheduler considers each FIFO for service in a circular sequence (e.g., for N FIFOs, from FIFO_0 to FIFO_1 and so on to FIFO_(N−1) before returning to FIFO_0 to repeat the sequence). If one or more FIFOs have data available after the processing of the currently selected FIFO has been completed (e.g., after a data packet has been extracted therefrom), then the round-robin FIFO scheduler will select the next FIFO in the round-robin sequence for service. If the FIFO that is next in the sequence does not have data available, then the FIFO scheduler skips over it to the next FIFO in the sequence, and so on, until a FIFO with data available is found, at which time that FIFO is selected for service. Prior-art implementations of such round-robin FIFO schedulers typically take at least one clock cycle to consider each different FIFO in the round-robin sequence, even those FIFOs that do not currently have data available for service.

The present invention can be used to implement a modified round-robin scheduling algorithm that does not waste clock cycles on FIFOs that do not currently have data available. In particular, because the scheduling algorithm is implemented using a look-up table that can simultaneously take into account the current status all of the FIFOs, a FIFO scheduler of the present invention can be configured to skip over any FIFOs that do not currently have data available for service. If the FIFO that is currently being serviced still has data available after being serviced and no other FIFOs have data available, then the FIFO scheduler can continue to select the current FIFO for service. If no FIFOs have data available after the currently selected FIFO is serviced, then the FIFO scheduler might continue to select that same FIFO but it will not be serviced. This can continue until a FIFO has data available for service. In a preferred implementation, whenever at least one FIFO has data available, another FIFO having data available will be selected for service within one clock cycle of the end of the servicing of the previously selected FIFO (including those situations where the same FIFO is re-selected).

Because FIFO scheduling of the present invention is driven by a look-up table, a FIFO scheduler can be configured to operate based on any suitable scheduling algorithm employed to determine which FIFO to service next. Round-robin sequences are just one possible type of FIFO scheduling algorithm. Those skilled in the art will understand that many other possible FIFO scheduling algorithms exist. Depending on the implementation, the LUT for a particular FIFO scheduling algorithm can be generated off line, external to the FIFO scheduler, and then loaded into the scheduler's memory for use during on-line data processing.

Moreover, because FIFO scheduling is based on a LUT, the execution time of the scheduling process is independent of the complexity of the scheduling algorithm. In other words, the time that it takes to execute the FIFO scheduler is the same when the LUT corresponds to a relatively simple scheduling algorithm (e.g., where the next FIFO selected depends on only a subset of the statuses of the other FIFOs) as when the LUT corresponds to a relatively complex scheduling algorithm (e.g., where the next FIFO selected depends on the statuses of all of the FIFOs).

Compared to the prior-art implementations, the present invention can be effectively implemented for any desired number of FIFOs, with the primary limitation being the size of the memory needed to store the corresponding LUT. As such, the present invention supports the implementation of more complex scheduling algorithms for greater numbers of FIFOs more efficiently than conventional implementations in which the scheduling algorithm is implemented entirely in an FSM with combinatorial feedback logic (or even in software).

In the implementation described for processing system 100 of FIG. 1, each instance of FIFO service involved the removal of a single data packet from a single FIFO. In alternative implementations, FIFO service could involve the removal of more than one data packet from the currently selected FIFO_i. In this case, the extractor could be implemented to look for EOP[i]=1 more than once, before determining that FIFO service had been completed. Moreover, each instance of FIFO service could involve the removal of data packets from more than one FIFO. For example, more than one bit in the control signal RE could be set to 1, and the FIFO bank could determine the sequence of processing those multiple FIFOs. Such processing could be supported by logic implemented within extractor 106.

Depending on the particular application, the data packets may be of fixed or variable length. For fixed-length data packets, the EOP signal becomes optional. In a particular, an extractor could be implemented with an internal timer that counts an appropriate number of clock cycles after re-asserting the read enable signal RE to determine, in an open-loop manner, when the currently selected FIFO has completed the extraction of a data packet.

Although the present invention has been described in the context of data processing applications that schedule service for data packets stored in storage devices implemented as FIFOs, the present invention is not so limited. For example, the data storage devices can be implemented using data structures other than FIFOs. Moreover, a data processing application could involve the scheduling of service for packet-based communication buses or other types of data pipes as the "data storage" devices.

Although memory device 102 of FIG. 1 has been described as being a read-only memory, the present invention can be implemented using any suitable type of memory device for storing the desired look-up table, including suitable random-access memory (RAM) devices.

Figure 3:
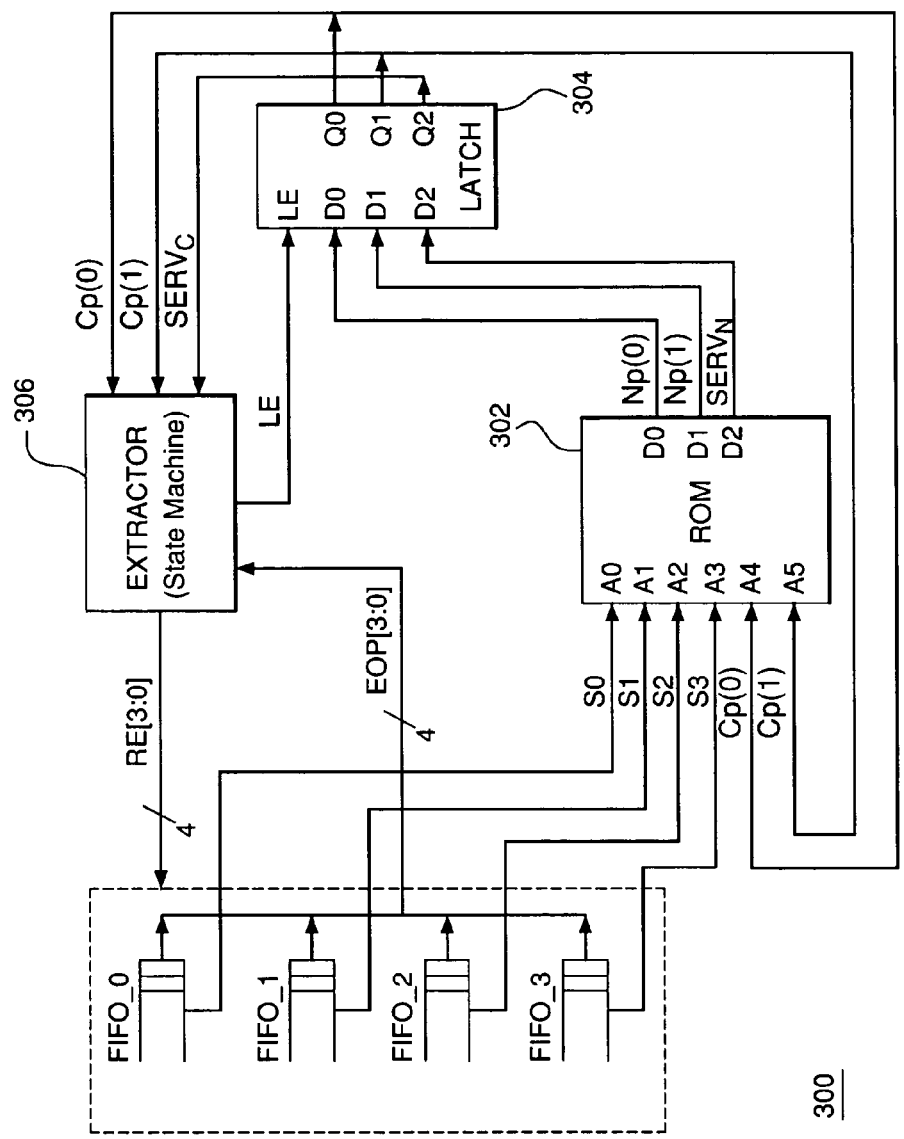
FIG. 3 shows a block diagram of a data packet processing system according to another embodiment of the present invention in which the FIFO scheduler controls the operations of four FIFOs.

FIG. 3 shows a block diagram of a data packet processing system 300 having a FIFO scheduler that controls the operations of four FIFOs (FIFO_0 to FIFO_3). Processing system 300 is based on the principles of processing system 100 of FIG. 1, analogously extended from the two FIFOs of FIG. 1 to the four FIFOs of FIG. 3. In this case, the LUT stored in memory 302 relies on six-bit input addresses corresponding to S0, S1, S2, S3, and Cp[1:0], where Si indicates whether FIFO i has data available for service, and Cp[1:0] is a two-bit code that identifies which FIFO is currently selected for service (e.g., Cp[1:0]=(00) indicates the FIFO 0 is selected, Cp[1:0]=(01) indicates the FIFO 1 is selected, and so on). The LUT generates three-bit outputs corresponding to Np[1:0] (which is analogous to Cp[1:0]) and $SERV_N$ (which is the same as in FIG. 1), and latch 304 updates Cp[1:0] and $SERV_C$ (which is the same as in FIG. 1). Like extractor 106 of FIG. 1, extractor 306 implements a two-state FSM like that shown in FIG. 2, except that extractor 306 receives a four-bit end-of-packet signal EOP[3:0] from the four FIFOs and generates a four-bit read enable control signal RE[3:0] for the four FIFOs.

A comparison of the systems of FIGS. 1 and 4 indicate that the present invention can be extended to larger and larger numbers of FIFOs simply by increasing the sizes of (1) the memory used to store the scheduling algorithm's LUT and (2) the latch used to update certain parameters. As described previously, for a given number of FIFOs, the FIFO scheduler can implement any desired scheduling algorithm of any desired level of complexity without impacting execution time.

Because the FIFO scheduler is based on a look-up table, the memory device (if reprogrammable) can be reconfigured to change the scheduling algorithm. In particular, the scheduling algorithm and/or the number of FIFOs to be serviced can be changed simply by changing (e.g., rewriting) the LUT stored in the memory. None of the rest of the hardware needs to be changed, including the latch and the extractor. Moreover, the same hardware design can be used for different instances of the circuitry that support different applications (e.g., involving different scheduling algorithms or different numbers of FIFOs).

This flexibility of the present invention is especially advantageous in situations in which the processing system is implemented in programmable processors such as FPGAs. In conventional FPGA implementations in which the FIFO scheduler is implemented using an FSM with combinatorial feedback logic, the number of FIFOs and/or the complexity of scheduling algorithm have been limited by the available circuit layout space, routing resources, logic placement, and applicable timing constraints. Moreover, changing the scheduling algorithm would involve changing the design of the combinatorial feedback logic used to implement the FIFO scheduler. This in turn would often require redesign of much if not all of the FPGA programming, including possibly having to redo the placement and routing for the entire FPGA circuit.

Although the present invention has been described in the context of FPGAs, those skilled in the art will understand that the present invention can be implemented in the context of other types of devices, such as, without limitation, programmable logic devices (PLDs), mask-programmable gate arrays (MPGAs), simple programmable logic device (SPLDs), and complex programmable logic devices (CPLDs), and even devices such as application-specific integrated circuits (ASICs).

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A scheduler for a plurality of FIFOs, the scheduler comprising:
    a ROM adapted to store a look-up table (LUT) that maps an input address to a LUT output, wherein:
    the input address corresponds to current status of one or more of the FIFOs; and
    the LUT output identifies a next FIFO to select for service and whether the next FIFO has data available for service;
    a latch adapted to store and forward the LUT output; and
    a finite state machine (FSM) implemented using combinatorial feedback logic and adapted to receive the forwarded LUT output from the latch and to generate (1) a latch enable (LE) control signal that enables the latch to forward the LUT output and (2) a read enable (RE) control signal that identifies which one or more FIFOs are to be serviced.

2. The invention of claim 1, wherein the FSM comprises an FSM having an IDLE state and an EXTRACT state, wherein:
    when the FSM is in the IDLE state and a currently selected FIFO has no data available for service, the FSM sets the LE control signal to enable the latch to forward the LUT output; and when the FSM is in the EXTRACT state and service of the currently selected FIFO is completed, the FSM sets the LE control signal to enable the latch to forward the LUT output.

3. The invention of claim 2, wherein:

when the FSM is in the IDLE state and at least one FIFO has data available for service, the FSM transitions to the EXTRACT state; and when the FSM is in the EXTRACT state and no FIFO has data available for service, the FSM transitions to the IDLE state.

4. The invention of claim 1, wherein the current status of the one or more FIFOs comprises an indication of whether each FIFO has data available for service and an indication of which FIFO is currently selected for service.

5. The invention of claim 4, wherein a FIFO has data available for service when the FIFO currently stores more than a specified threshold number of data packets.

6. The invention of claim 1, wherein the FSM is further adapted to receive service status information from the FIFOs.

7. The invention of claim 6, wherein the service status information comprises an indication of completion of service of the currently selected FIFO.

8. A method for scheduling service for a plurality of FIFOs, the method comprising:

accessing a look-up table (LUT) stored in a ROM with an input address to retrieve a LUT output, wherein:

the input address corresponds to current status of one or more of the FIFOs; and the LUT output identifies a next FIFO to select for service and whether the FIFO has data available for service;

storing and forwarding the LUT output based on a received latch enable (LE) control signal;

with a finite state machine (FSM) implemented using combinatorial feedback logic;

generating the LE control signal based on the forwarded LUT output; and generating a read enable (RE) control signal that identifies which one or more of FIFOs are to be serviced, based on the forwarded LUT output.

9. The invention of claim 8, wherein the LE and RE control signals are generated using an FSM having an IDLE state and an EXTRACT state, wherein:

when the FSM is in the IDLE state and a currently FIFO has no data available for service, the LE control signal is set to forward the LUT output; and when the FSM is in the EXTRACT state and service of the currently selected FIFO is completed, the LE control signal is set to forward the LUT output.

10. The invention of claim 9, wherein:

when the FSM is in the IDLE state and at least one FIFO has data available for service, the FSM transitions to the EXTRACT state; and when the FSM is in the EXTRACT state and no FIFO has data available for service, the FSM transitions to the IDLE state.

11. The invention of claim 8, wherein the current status of the one or more FIFOs comprises an indication of whether each FIFO has data available for service and an indication of which FIFO is currently selected for service.

12. The invention of claim 11, wherein a FIFO has data available for service when the FIFO currently stores more than a specified threshold number of data packets.

13. The invention of claim 8, wherein the LE and RE control signals are generated based on service status information from the FIFOs.

14. The invention of claim 13, wherein the service status information comprises an indication of completion of service of the currently selected FIFO.

* * * * *

UNITED STATES PATENT AND TRADEMARK OFFICE
CERTIFICATE OF CORRECTION

| | |
|---|---|
| PATENT NO. | : 7,234,030 B1 |
| APPLICATION NO. | : 10/809180 |
| DATED | : June 19, 2007 |
| INVENTOR(S) | : Navdhish Gupta and Gary Allen |

It is certified that error appears in the above-identified patent and that said Letters Patent is hereby corrected as shown below:

Col. 9, line 36: replace "feedback logic;" with -- feedback logic: --.
Col. 10, line 9: replace "currently FIFO" with -- currently selected FIFO --.

Signed and Sealed this

Twenty-fourth Day of June, 2008

JON W. DUDAS
*Director of the United States Patent and Trademark Office*